United States Patent Office 3,341,590
Patented Sept. 12, 1967

3,341,590
PROCESS FOR PREPARING OXIMES
Lawrence R. Jones, Terre Haute, Ind., assignor to Commercial Solvents Corporation, New York, N.Y., a corporation of Maryland
No Drawing. Filed July 6, 1965, Ser. No. 469,929
8 Claims. (Cl. 260—566)

This invention relates to a process for the production of oximes. In a particular aspect this invention relates to a process for the production of oximes by treatment of a secondary nitroparaffin with carbon monoxide in the presence of sulfuric acid.

Oximes have a wide variety of uses. Cyclohexanone oxime is an intermediate in the production of caprolactam while methyl ethyl ketoxime and acetone oxime are used as anti-skinning agents in coatings. Many methods are known for producing oximes. One method involves hydrogenation of a nitroparaffin in the presence of sulfuric acid and a metal catalyst. Another method used for the production of cyclohexanone oxime in particular involves the treatment of a water-soluble alkali metal salt of nitrocyclohexane in the presence of sulfuric acid.

It is an object of the present invention to provide a process for the production of oximes.

Further objects and advantages of the present invention will be apparent from the specification and the appended claims.

The present invention resides in the discovery that oximes are obtained by passing carbon monoxide into a sulfuric acid solution of a secondary nitroparaffin.

The nitroparaffins employed in the present invention are secondary nitroparaffins, that is to say nitroparaffins wherein the nitro group is attached to a carbon atom, which is in turn attached to two and not more than two carbon atoms. Typically suitable nitroparaffins are represented by the formula $R-NO_2$ wherein R is a radical selected from the group consisting of cyclohexyl and

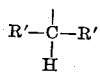

and wherein R′ is a lower alkyl radical, that is an alkyl radical containing from one up to about three carbon atoms. Representative secondary nitroparaffins which may be employed in the present invention include nitrocyclohexane, 2-nitropropane, 2-nitrobutane, 3-nitroheptane, etc., and the like. Oximes prepared from such typically suitable nitroparaffins are represented by the formula $R=NOH$ wherein R is a radical selected from the group consisting of cyclohexyl and

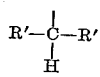

wherein R′ is a lower alkyl radical. Representative oximes include methyl ethyl ketoxime, cyclohexanone oxime, acetone oxime, etc., and the like.

The sulfuric acid solution of secondary nitroparaffin of use in the present invention may be prepared by any suitable means, as for example, by dissolving a secondary nitroparaffin in sulfuric acid. The sulfuric acid of the process may be of any suitable concentration even in excess of 100 percent, i.e. when excess $SO_3$ is present. When sulfuric acid solutions of a concentration of less than 50 percent are utilized, the reaction proceeds slowly; whereas when the concentration of the acid is in excess of 100 percent, handling of the reaction mixture becomes difficult. As a compromise between the handling problems involved in the use of sulfuric acid having a concentration of in excess of 100 percent and the slowness of the reaction when the sulfuric acid concentration is less than 50 percent, it is preferred that the concentration of the sulfuric acid range from about 70 to about 100 percent.

The mole ratio of carbon monoxide to secondary nitroparaffin is of importance in the present invention. While oximes are obtained at lower ratios best results are obtained when the mole ratio of carbon monoxide to secondary nitroparaffin is in excess of 2:1, for example 4–10:1. While not deleterious to the reaction use of an additional excess of carbon monoxide serves no useful purpose.

The reaction is exothermic and requires no external source of heat. The reaction takes place at temperatures as low as about 0° C. and as high as about 100° C. At temperatures below 20° C. the reaction proceeds very slowly while at temperatures above 60° C. the reaction proceeds so rapidly that it becomes difficult to control. Therefore, temperatures of from about 20 to about 60° C. are preferred in the present invention.

Oximes produced according to the process of the present invention may be recovered from the sulfuric acid reaction medium by any suitable procedure. One such procedure involves neutralizing the reaction medium with a suitable base, then extracting the oxime from the neutralized medium with a suitable solvent for the oxime and finally removing the solvent from the oxime.

The invention will be understood more fully by reference to the following specific examples. It is understood that the examples are presented for purposes of illustration only and are not intended as a limitation of the invention.

Example 1

Into a suitable reaction vessel containing 40 ml. of aqueous sulfuric acid (96% concentration) were slowly added 12.9 grams of nitrocyclohexane. The resulting solution was cooled to approximately 20° C. in a water bath and carbon monoxide was bubbled into the solution for one-half hour at a rate of approximately 1 to 2 pounds per hour. At the end of the one-half hour period, the resulting reaction mixture was slowly combined with 200 mls. of distilled water and the pH of the combination of water and reaction mixture was adjusted to 7.0 by addition of sodium hydroxide. The resulting material was then extracted with ethyl ether. Cyclohexanone oxime was produced in a yield of 34 percent based on the nitrocyclohexane starting material.

Example 2

Into a suitable reaction vessel containing 25 mls. of aqueous sulfuric acid (80 percent concentration) were slowly added 12.9 grams of nitrocyclohexane. The resulting solution was cooled in a water bath to approximately 25° C. and carbon monoxide was bubbled into the solution for four hours at a rate of approximately 1 to 2 pounds per hour. Cyclohexanone oxime was produced in a yield of 52 percent based on the nitrocyclohexane.

The cyclohexanone oxime of Example 2 may be converted to caprolactam by conventional Beckmann rearrangement procedures. In one such procedure the sulfuric acid reaction medium containing the cyclohexanone oxime is heated to from about 90 to about 150° C. for a period of approximately 1 to 2 hours. If desired, the strength of the sulfuric acid may be increased with additional sulfuric acid or with $SO_3$.

Example 3

A sulfuric acid solution of 2-nitropropane is treated with carbon monoxide following the procedure of Example 2. Acetone oxime is obtained.

Example 4

A sulfuric acid solution of 2-nitrobutane is treated with carbon monoxide following the procedure of Example 2. Methyl ethyl ketoxime is obtained.

Since many embodiments may be made of this invention and since many changes may be made in the embodiments described, the foregoing is to be interpreted as illustrative only and the invention is defined by the claims appended hereto.

I claim:

1. A process for the production of oximes which comprises providing a sulfuric acid solution of a nitroparaffin of the formula R—$NO_2$ wherein R is a radical selected from the group consisting of cyclohexyl and

wherein R′ is a lower alkyl radical and passing carbon monoxide into the said solution thereby producing oximes of the formula R=NOH wherein R is a radical selected from the group consisting of cyclohexyl and

wherein R′ is a lower alkyl radical.

2. A process for the production of oximes which comprises providing a sulfuric acid solution of a nitroparaffin of the formula R—$NO_2$ wherein R is a radical selected from the group consisting of cyclohexyl and

wherein R′ is a lower alkyl radical the said solution having a temperature of from about 0 to about 100° C., passing carbon monoxide into the said solution while maintaining the temperature of the said solution at from about 3 to about 100° C. thereby producing oximes of the formula R=NOH wherein R is a radical selected from the group consisting of cyclohexyl and

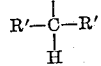

wherein R′ is a lower alkyl radical.

3. The process of claim 2 wherein the temperature ranges from about 20 to about 60° C.

4. The process of claim 2 wherein the concentration of sulfuric acid ranges from about 70 to about 100 percent.

5. The process of claim 2 wherein the mole ratio of carbon monoxide to oxime is in the range of 2:1 to 10:1.

6. The process of claim 2 wherein the nitroparaffin is nitrocyclohexane.

7. The process of claim 2 wherein the nitroparaffin is 2-nitropropane.

8. The process of claim 3 wherein the nitroparaffin is 2-nitrobutane.

References Cited

UNITED STATES PATENTS 2,945,065   7/1960   Donaruma _____ 260—566

CHARLES B. PARKER, *Primary Examiner.*

R. V. HINES, *Assistant Examiner.*

UNITED STATES PATENT OFFICE

CERTIFICATE OF CORRECTION

Patent No. 3,341,590  September 12, 1967

Lawrence R. Jones

It is hereby certified that error appears in the above numbered patent requiring correction and that the said Letters Patent should read as corrected below.

Column 4, line 4, for "about 3" read -- about 0 --.

Signed and sealed this 31st day of December 1968.

(SEAL)
Attest:

Edward M. Fletcher, Jr.

Attesting Officer

EDWARD J. BRENNER

Commissioner of Patents